(12) United States Patent
Budmiger

(10) Patent No.: US 7,891,255 B2
(45) Date of Patent: Feb. 22, 2011

(54) APPARATUS FOR MEASUREMENT OF VOLUME-OR-MASS-FLOW OF A MEDIUM

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 33 days.

(21) Appl. No.: 12/226,359

(22) PCT Filed: Apr. 13, 2007

(86) PCT No.: PCT/EP2007/053597

§ 371 (c)(1),
(2), (4) Date: Jan. 26, 2009

(87) PCT Pub. No.: WO2007/122115

PCT Pub. Date: Nov. 1, 2007

(65) Prior Publication Data

US 2009/0315545 A1   Dec. 24, 2009

(30) Foreign Application Priority Data

Apr. 20, 2006   (DE) ....................... 10 2006 018 728

(51) Int. Cl.
*G01F 1/56* (2006.01)
(52) U.S. Cl. .................................... 73/861.08
(58) Field of Classification Search .............. 73/861.15, 73/861.08, 861.12, 861.52, 861.04
See application file for complete search history.

(56) References Cited

U.S. PATENT DOCUMENTS

| 4,575,678 | A | 3/1986 | Hladky | |
|---|---|---|---|---|
| 5,351,554 | A | 10/1994 | Budmiger | |
| 5,560,246 | A * | 10/1996 | Bottinger et al. | 73/861.15 |
| 6,920,799 | B1 * | 7/2005 | Schulz | 73/861.52 |

FOREIGN PATENT DOCUMENTS

| CN | 1409093 A | 4/2003 |
|---|---|---|
| CN | 1946989 A | 4/2007 |
| DE | 2 027 947 | 12/1971 |
| DE | 101 18 002 | 10/2002 |
| DE | 698 04 857 | 10/2002 |
| DE | 102 55 698 | 7/2004 |
| GB | 2 292 613 | 2/1996 |
| GB | 2 371 869 | 8/2002 |
| JP | 04295721 | 10/1992 |
| JP | 2003 028683 | 1/2003 |
| RU | 2 030 713 C1 | 3/1995 |

* cited by examiner

*Primary Examiner*—Jewel Thompson
(74) *Attorney, Agent, or Firm*—Bacon & Thomas, PLLC

(57) ABSTRACT

An apparatus for measuring volume- or mass-flow of a medium flowing through a measuring tube in the direction of a measuring tube axis, includes: a magnet system producing a magnetic field passing through the measuring tube essentially transversely to the measuring tube axis; at least one measuring electrode coupled with the medium; a reference component lying at a defined potential, wherein the reference component is connected with a resistance; and a control/evaluation unit, which, on the basis of measurement voltage induced in the at least one measuring electrode, delivers information concerning volume- or mass flow of the medium in the measuring tube. For the purpose of an early recognizing of a malfunction of the measuring apparatus device, or a component of the measuring apparatus device, a measuring device is provided, which makes available information concerning whether electrical current is flowing through the resistance.

9 Claims, 2 Drawing Sheets

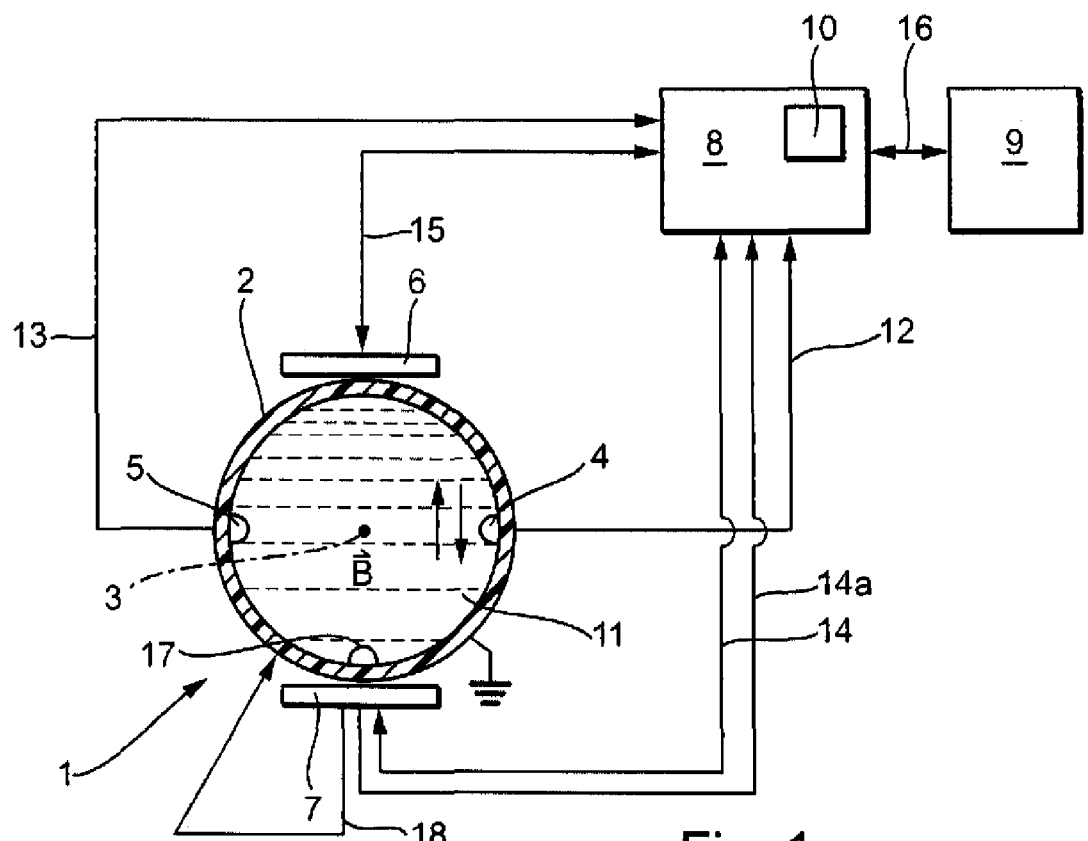
Fig. 1 (Stand der Technik)
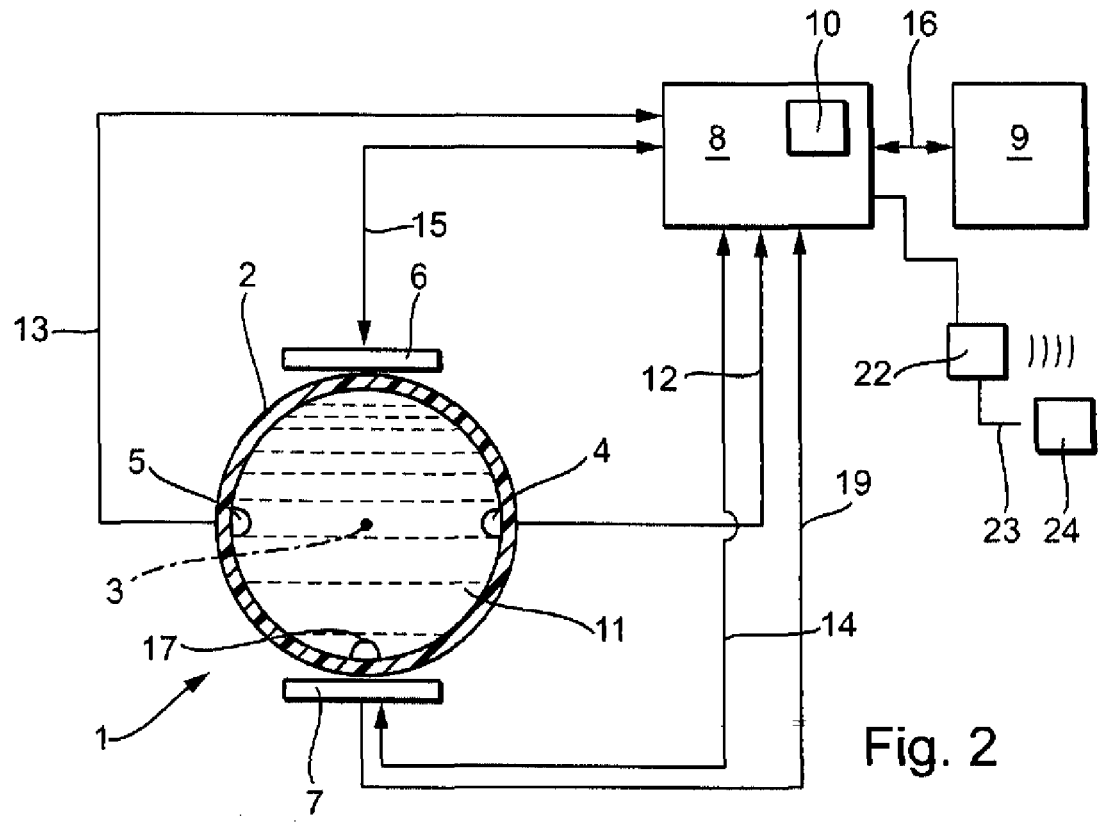
Fig. 2

APPARATUS FOR MEASUREMENT OF VOLUME-OR-MASS-FLOW OF A MEDIUM

TECHNICAL FIELD

The invention relates to an apparatus for measurement of volume- or mass-flow, e.g. flow rate, of a medium flowing through a measuring tube in the direction of the measuring tube axis, and includes: a magnet system, which produces a magnetic field passing through the measuring tube essentially transversely to the measuring tube axis; at least one measuring electrode coupled with the medium; a reference component lying at a defined potential and connected with a resistance; and a control/evaluation unit, which delivers information concerning volume- or mass flow of the medium in the measuring tube on the basis of measurement voltage induced in the at least one measuring electrode.

BACKGROUND DISCUSSION

U.S. Pat. No. 6,920,799 B1 discloses a magneto-inductive, flow measuring device, with which it is possible to suppress corrosive degradation of a reference electrode. This known remedy assumes, that the reference electrode is usually in direct contact with the medium. If an electrical current flows through the reference electrode, then this leads, as a result of electrolysis, to corrosion on the reference electrode. This is, naturally, highly undesirable. In order to limit the electrical current flowing through the reference electrode, this patent proposes to connect a limiter resistance after the reference electrode. The patent recommends, thus, a remedy, in the case of which an electrical current flowing through the reference electrode is lowered, without taking into consideration, or removing, the cause of the electrical current flow. A corrosive degradation of the measuring electrodes remains unrecognized; as a result, a corrosion of the measuring electrodes is also not counteracted. While, in the case of this known remedy, danger of corrosion of the reference electrode is reduced, a high-resistance, reference potential results, due to the after-connected, relatively large resistance, and this means that stability and reproducibility of the measured values can significantly worsen.

SUMMARY OF THE INVENTION

An object of the invention is to provide a magneto-inductive, flow measuring device, in the case of which a malfunction of the flow-measuring device, or at least a component of the flow measuring device, is brought to light.

The object is achieved by providing a measuring device, which makes available information on whether an electrical current is flowing through the resistance. An electrical current flowing through the reference electrode and, thus, also, through the resistance, is, according to the invention, a clear indication of a malfunction in the magneto-inductive, flow measuring device. This information concerning malfunction is made available to the operating personnel. It is then possible for the operating personnel, in reaction to the indication, that a current is flowing through the reference point, to take suitable countermeasures. Thus, an electrical current flowing through the reference electrode is an additional measured variable, which is referenced for predictive maintenance purposes. Corrosion of the reference electrode and the measuring electrodes can be counteracted early by suitable countermeasures.

In an advantageous embodiment of the apparatus of the invention, it is provided, that the control/evaluation unit compares an actual electrical current value with a predetermined, limit electrical current value and that the control/evaluation unit generates a warning report, when the actual electrical current value exceeds the limit electrical current value. Thus, predictive maintenance becomes possible for the flow measuring device.

An advantageous embodiment of the apparatus of the invention provides, that the reference component is a reference electrode, which is contacted by the medium. Concerning the defined potential of the reference electrode, such is, preferably, ground, or earth, potential. Of course, instead of a grounded reference electrode, also a grounding gasket can be employed in connection with the present invention.

As regards the resistance, an advantageous embodiment provides that it is a relatively small resistance. A suitable resistance is smaller than 10 ohm. Preferably, the resistance amounts to 0.1 ohm. In an embodiment of the invention utilizing a low-ohm resistance, even if an electrical current does flow, the influence on the reference potential is minimal, so that no significant effects on the quality of measurement occur.

In connection with the apparatus of the invention, it is considered as advantageous, when the actual electrical current values are modified by means of some desired weighting. This weighting can be, for example, 1 or a multiple, $I^2, I^3, I^{1/2}$, etc. Thus, high electrical currents are weighted essentially more strongly than low electrical currents.

Viewed as especially advantageous is an embodiment wherein the control/evaluation unit integrates the actual electrical current values over a predetermined time span, and the integrated actual electrical current values are compared with electrical current values stored as a function of life expectancy of the measuring device, or of a particular component of the measuring device, and that the control/evaluation unit provides information concerning the probable life expectancy of the measuring device or concerning the life expectancy of the particular component of the measuring device. The component can be, for example, the reference electrode or a measuring electrode.

In an advantageous embodiment of the apparatus of the invention, a display unit is provided, via which the warning report and/or the information concerning the remaining life expectancy of the measuring device or of the at least one component of the measuring device are/is displayable.

Alternatively, or in addition, a communication unit is provided, via which the warning report and/or the information concerning the life expectancy of the measuring device, or the at least one component of the measuring device, is transmitted to a remote control room. The communication unit transmits the data wirelessly or via a connecting line to the control room or to some other service-tool, e.g. a handheld.

BRIEF DESCRIPTION OF THE DRAWINGS

The invention will now be explained in greater detail on the basis of the appended drawing, the figures of which show as follows:

FIG. 1 a schematic drawing of a magneto-inductive, flow measuring device known from the state of the art;

FIG. 2 a schematic drawing of a preferred embodiment of the magneto-inductive, flow measuring device of the invention.

DETAILED DISCUSSION

Figure 3:
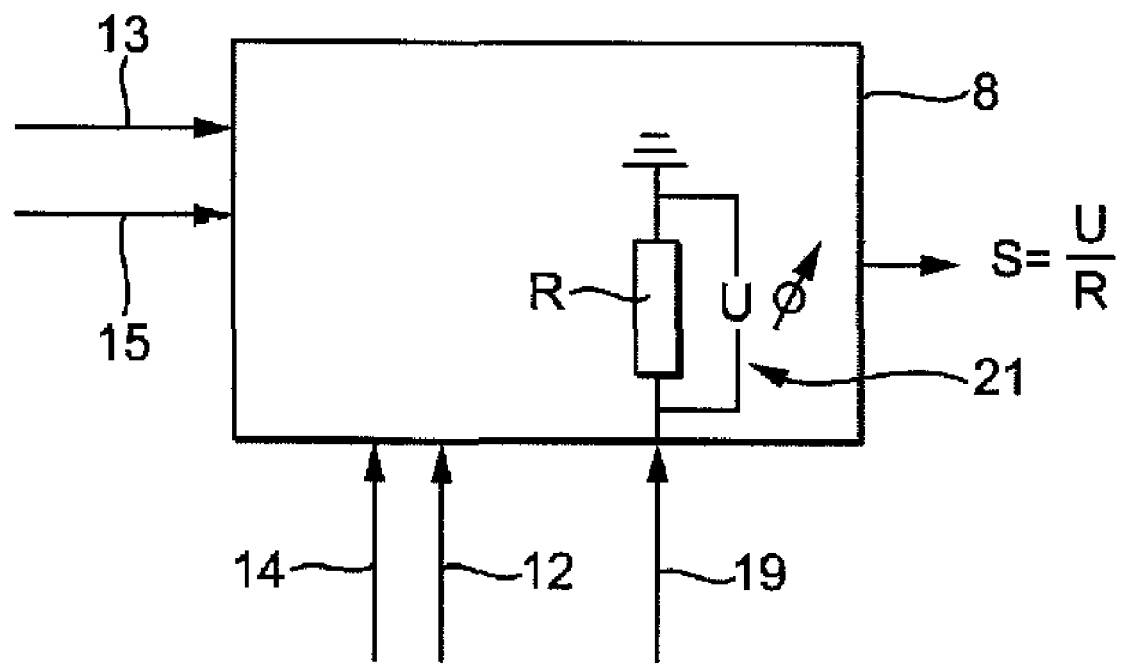
FIG. 3 a block diagram of the electrical current detection device of the invention for recognizing a malfunction of the magneto-inductive, flow measuring device of the invention.

FIG. 1 shows a schematic drawing of a magneto-inductive, flow measuring device known from the state of the art. Magneto-inductive, flow measuring devices of such type are sold by the assignee under the designation PROMAG. Medium 11 flows through the measuring tube 2 in the direction of the measuring tube axis 3. The medium 11 is at least slightly electrically conductive. Measuring tube 2 is made of a non-conductive material, or, at least it is lined on its inner surface with a non-conductive material.

The magnetic field B directed perpendicularly to the flow direction of the medium 11 is produced, in the illustrated case, by the diametrally situated coil arrangement 6, 7 or by two electromagnets. Under the influence of the magnetic field B, charge carriers located in the medium 11 migrate, depending on polarity, to the two, oppositely poled, measuring electrodes 4, 5. The measurement voltage established on the measuring electrodes 4, 5 is measured, in each case, relative to the potential of the reference electrode 17. In the illustrated case, the reference electrode 17 lies, via the line 18, at earth, or ground, potential or at housing potential. The measurement voltage is proportional to the flow velocity of the medium 11 averaged over the cross section of the measuring tube 2, i.e. it is a measure for the volume flow rate of the medium 11 in the measuring tube 2. The measuring tube 2 is, moreover, via connecting elements, e.g. flanges, which are not specially illustrated in the drawing, connected with a pipe system, through which the medium 11 flows. The measuring electrodes 4, 5 are in direct contact with the medium 11 in the illustrated example; the coupling can, however, as was already mentioned above, also be of capacitive nature.

Via connecting lines 12, 13, the measuring electrodes 4, 5 are connected with the control/evaluation unit 8. The measurement information is fed via data lines 12, 13, 14a to the control/evaluation unit 8. The particular circuit construction, showing how the measurement signals of the measuring electrodes 4, 5 are tapped relative to the ground potential of the reference electrode 17, is not explicitly illustrated in FIG. 1, since it is sufficiently known from the state of the art. To be referenced here are the magneto-inductive, flow measuring devices sold by the assignee under the designation PROMAG. Connection between the coil arrangements 6, 7 and the control/evaluation unit 8 is accomplished via the connecting lines 14, 15. The control/evaluation unit 8 is connected via the connecting line 16 with an input/output unit 9. Memory unit 10 is assigned to the evaluation/control unit 8.

FIG. 2 shows a schematic drawing of a preferred embodiment of the magneto-inductive, flow measuring device 1 of the invention. This flow measuring device differs from the known one in FIG. 1, in that a resistance 20 is connected after the reference electrode 17. This is shown in FIG. 3 in the detail from FIG. 2. Resistance 20 is low-ohm and amounts, preferably, only to a fraction of an ohm. The current I flowing through the resistance 20 is ascertained by means of a measuring device 21. This actual, electrical current value is made available to the control/evaluation unit 8. According to the invention, a flowing current I is an unequivocal indication, that there is danger of corrosion at the reference electrode 17. As soon as the actual electrical current value reaches or exceeds a predetermined limit electrical current value, a warning report is generated. A corresponding indication is presented on the display unit 9. Alternatively, or in addition, the warning report is transmitted via a communication unit 22, wirelessly or via a connecting line 23, to a remote location, e.g. to a handheld or to a control room 24.

As already mentioned above, the control/evaluating unit 8 performs a weighting of the actual electrical current values. Thus, a high actual electrical current is more strongly weighted than a low actual electrical current. Beyond that, it is provided, that the control/evaluation unit 8 integrates the detected actual electrical current values over time. In this way, it is possible to reach a conclusion as to when, at the latest, the flow measuring device 1, or at least a component of the flow measuring device 1, e.g. the reference electrode 17, must be replaced. Memory unit 10 serves for storing the measurement data.

The invention claimed is:

1. An apparatus for measuring volume- or mass-flow of a medium flowing through a measuring tube in a direction of a measuring tube axis, comprising:
    a magnetic system producing a magnetic field passing through the measuring tube essentially transversely to the measuring tube axis;
    at least one measuring electrode coupled with the medium;
    a reference component lying at a defined potential, wherein said reference component is connected with a resistance;
    a control/evaluation unit, which delivers, on the basis of a measurement voltage induced in said at least one measuring electrode, information concerning the volume- or mass flow of the medium in the measuring tube; and
    a measuring device for providing information concerning whether an electrical current is flowing through said resistance.

2. The apparatus as claimed in claim 1, wherein:
    said control/evaluation unit compares an actual electrical current value with a predetermined limit electrical current value; and
    said control/evaluation unit generates a warning report, when the actual electrical current value exceeds the limit electrical current value.

3. The apparatus as claimed in claim 1, wherein:
    said reference component is a reference electrode in contact with the medium, and
    the defined potential is earth, or ground, potential.

4. The apparatus as claimed in claim 1, wherein:
    said resistance is smaller than 10 ohm.

5. The apparatus as claimed in claim 1, wherein:
    the actual electrical current values are weighted (e.g. $I^2$, $I^3$, $I^{1/2}$, etc.).

6. The apparatus as claimed in claim 1, wherein:
    said control/evaluation unit integrates the actual electrical current values over a predetermined time span, the integrated actual electrical current value is compared with stored, electrical current values as a function of life expectancy of a measuring device, or of an individual component of said measuring device; and
    said control/evaluation unit provides information concerning probable life expectancy of said measuring device or probable life expectancy of said individual component of said measuring device.

7. The apparatus as claimed in claim 1, further comprising:
    a display unit, via which the warning report and/or the information concerning remaining service life of a measuring device or of at least one component of said measuring device is displayable.

8. The apparatus as claimed in claim 1, further comprising:
    a communication unit, via which the warning report and/or the information concerning life expectancy of a measuring device, or of the at least one component of said measuring device, is transmitted to a remote, control room.

9. The apparatus as claimed in claim 8, wherein:
    said communication unit transmits the warning report and/or the information, wirelessly or via a connecting line, to the control room.

* * * * *